United States Patent Office 2,736,654
Patented Feb. 28, 1956

2,736,654

BREAD-MAKING COMPOSITION

Roland W. Selman, Jr., and Marvin K. Landcraft, Kansas City, Mo., assignors to De-Raef Corporation, Kansas City, Mo., a corporation of Missouri No Drawing. Application April 22, 1952,
Serial No. 283,754

8 Claims. (Cl. 99—91)

Our invention relates to a composition for making bread and more particularly to a composition which will enable cheese whey to be used in white bread without deleterious results.

Whey is derived from milk in the cheese-making operation and is the product which remains after the removal of most of the casein and fat from milk incident to the process of making cheese. Whey is relatively rich in lactalbumin, lactose and mineral matter. Presently large quantities of whey are dried or condensed for use as animal feed. It is sometimes used as an added ingredient to various milk products used in baking, such as dry nonfat milk solids and other milk powder-containing products sold as proprietary mixtures for bakers' use. It is not now used as a direct baking material.

As now known to the art, whey, when added to a bread dough, does not produce a bread of as good a quality as that when conventional nonfat dry milk solids are used. During World War II nonfat dry milk solids were in short supply to the baking industry and it was attempted to employ dried cheese whey as a substitute for nonfat milk solids in the confection of bread and rolls. Dried cheese whey contains more lactose and less protein than nonfat dry milk solids. Unfortunately, however, it was found that when cheese whey was used in place of nonfat dry milk solids the loaf volume of the bread was materially decreased.

One object of our invention is to provide a composition for making bread in which dried whey may be employed instead of nonfat dry milk solids as an addition agent to the dough to produce bread and rolls equal to or superior to that produced from the addition of a like quantity of nonfat dry milk solids.

Another object of our invention is to provide a composition for making bread which will enable whey to be used instead of nonfat dry milk solids which will produce a bread of superior volume and improved grain.

A further object of our invention is to provide a composition for making bread employing whey which will produce a crust color, loaf symmetry, crust character, taste, texture and chewability equal to that gained when employing nonfat dry milk solids.

Another object of our invention is to provide a composition for making bread employing whey in which improved crumb color and aroma are obtained over that when employing nonfat dry milk solids.

Other and further objects of our invention will appear from the following description.

In general, our composition comprises a major proportion of dried whey and a minor proportion of calcium carbonate together with lesser proportions of monocalcium acid phosphate and a minute proportion of enrobed calcium peroxide.

The enrobing agent for the calcium peroxide may be any hydrogenated shortening or may be lard. The calcium peroxide particles are enrobed or enveloped with a shortening and this method produces a surprising improvement in the stability of oxidizing agents.

A typical preferred composition in accordance with our invention is as follows:

83.00 parts by weight dried cheese whey .14 part by weight calcium peroxide .80 part by weight flour salt (sodium chloride finely granulated)
15.30 parts by weight calcium carbonate .70 part by weight monocalcium acid phospate
.06 part by weight shortening (as enrobing agent for calcium peroxide)

It is to be understood, of course, that this basic formula may be varied considerably without seriously affecting its baking efficiency in the making of bread. The monocalcium phosphate, for example, may be omitted, though its addition does improve the result obtained. The salt is added for taste and may be omitted from the composition. The critical elements of the composition are the calcium carbonate and the calcium peroxide. Each of these ingredients may be reduced by as much as twenty-five percent of their weight or increased by as much as twenty-five percent of their weight and still obtain improved results. The preferred composition is outlined above. Similarly, part of the cheese whey may be replaced by nonfat dry milk solids. Likewise, sugar, such as sucrose or dextrose, may be added. Similarly, the enrobing of the calcium peroxide may be omitted, though its use improves the result in improving the stability of the oxidizing agent where our composition is prepared and packed for future use.

In its broadest aspect our invention contemplates a composition comprising a major proportion of cheese whey, a minor proportion of the calcium carbonate and a minute proportion of calcium peroxide. In its more narrow aspects our invention comprises a major proportion of cheese whey, a minor proportion of calcium carbonate, a lesser proportion of monocalcium acid phosphate and a minute proportion of enrobed calcium peroxide.

A large number of experiments had to be made before we arrived at our composition. Just why the improved results are obtained we do not know, nor is this important. Calcium peroxide is old as a dough-improver. The improvement obtained in combination, however, with the calcium carbonate, is far in excess of that obtained by the addition of calcium peroxide per se, or an enrobed calcium peroxide per se. These two ingredients are critical and must be used together. The addition of the monocalcium acid phosphate improves the result still further. In one thousand-pound batch which we made after we had determined by experimental bakes the correct composition, we made an error in the addition of the calcium carbonate, having about 35½% less than we had determined should be employed. The first bakes from this batch showed very poor results, which we could not understand. We discovered the error in the amount of calcium carbonate and added an additional 7½%, and the improvement in the baking quality was prodigious. There appears to be some interaction between the calcium carbonate and the calcium peroxide and the cheese whey, or, more narrowly, between the calcium carbonate, monocalcium acid phosphate, calcium peroxide and the cheese whey, which we do not understand. We would expect, from our knowledge of the art, to increase the ability of the dough to absorb water by the addition of calcium peroxide, but we would not expect an improvement in the over-all bread quality. Indeed, the use of calcium peroxide alone would not produce the tremendous improvement which we obtained when calcium peroxide, monocalcium acid phosphate and calcium carbonate are added to cheese whey.

In making our tests in the laboratory bakeshop we used the following formula, the percentages being by weight:

| | | |
|---|---|---|
| Flour, 100% | grams | 700 |
| Water | | Variable |
| Yeast, 2.5% | grams | 17.5 |
| Yeast, food, .65% | do | 4.75 |
| Milk, 3% | do | 21 |
| Sugar, 6% | do | 42 |
| Lard, 2% | do | 14 |
| Salt, 2.25% | do | 15.75 |

We used the sponge-dough method. A 60 percent sponge is to be used on the basis of the 700 grams of flour used for each dough. This means that 420 grams of flour go into the sponge. An absorption of 57 percent water is added to the flour for sponging. The entire amount of yeast is emulsified in the sponge water prior to the addition to the flour. The total amount of yeast food is added to this stage.

It is convenient in weighing up sponge ingredients to add the yeast food directly on top of the flour of a series of containers holding all of the sponge ingredients for all of the baked projects for a particular run. If it is necessary to add malt, this should be added on top of the yeast food.

The sponge is mixed one minute in the low speed of the Hobart mixer, then two minutes in second speed and its final temperature should be 80° F. To prevent excess flour dust, the water and yeast solution should be poured into the mixing bowl before the other sponge ingredients are put in. The sponge is put in a metal trough, then into a fermentation cabinet held at a constant temperature and with just sufficient humidity to prevent the crusting of the sponges.

Sponges are fermented four and one-half hours. While the sponges are fermenting it is convenient to weigh up the dough ingredients and place all of the ingredients in the dough ingredient cans before the first dough is mixed.

The procedure for mixing the dough is as follows: The dry ingredients and the remainder of the water are placed in the bowl. The mixer is then turned on to run in the lowest speed of the Hobart A120 mixer. During this first part of the three-minute period the sponge is added in three or four approximately equal lumps. At the end of three minutes mixing in low speed, the speed is increased to the second speed of the mixer and the dough is mixed for the predetermined mixing time.

Doughs should come out of the mixer at 80° F. In order that this may be done it will be necessary to (1) use ice water as the dough water, (2) provide the bowl of the mixer with an ice water bath. Some care on the operator's part is necessary to maintain the dough temperature constant at 80°. Immediately after the conclusion of the mixing period, the dough is removed and placed back in the fermentation trough and a thermometer inserted. After one minute the thermometer is read and the trough containing the dough is returned to the fermentation cabinet for a variable period, which usually is about thirty minutes. The dough is then removed and two eighteen-ounce pieces are scaled from it. Each of these pieces is then formed into a ball by a manual operation which is intended to simulate the function of the commercial bakeshop rounder. The pieces are then dusted and allowed to stand in a slightly incubated cabinet for a period of ten minutes.

After this period, which corresponds to the commercial bakeshop's overhead proof period, each piece is moulded with a Thomson moulder. The moulded dough piece is then placed in a pan, numbered, and proofed by placing in a Humi-Temp cabinet until the top surface of the bread is one-half inch above the top of the pan.

The loaves are then put into the oven for the baking operation. The oven temperature is 435° and the baking period is twenty-two minutes.

At the end of the baking period, the loaf is removed from the oven, placed on a rack, and allowed to cool for one hour before the bread is placed in polyethylene bags. The bread is returned to the rack until the next morning when it is examined for quality.

The yeast food which we add is manufactured and sold under the trade-mark "Arkady." It has an average composition of 11.2% ammonium chloride, 30.8% calcium sulphate, .308% potassium bromate and 57.692% flour. The calcium carbonate of our composition is insoluble but it neutralizes excess acids germinated during fermentation as they occur. As pointed out above, if the calcium carbonate is not present within the critical amount, the result is not obtained. The calcium peroxide is also critical. If it is omitted or not present within the critical quantity, the improved results are not obtained. The monocalcium acid phosphate acts as a buffer and the calcium ions seem to have some effect on the ingredients of cheese whey.

In making our composition we premix one pound six ounces of calcium peroxide with ten ounces of a shortening comprising a hydrogenated vegetable fat which has previously been melted to a liquid state. These two ingredients are thoroughly mixed and eight ounces of flour salt is added while the mixing continues. We then add two pounds of finely comminuted calcium carbonate. In order to prevent soft lumps present in this premix of enrobed calcium peroxide we grind the premix and make sure that no lumps are present. This premix of enrobed calcium peroxide is then added to eight hundred thirty pounds of dried cheese whey, seven pounds of monocalcium acid phosphate and one hundred fifty pounds of finely comminuted calcium carbonate. The ingredients are blended thoroughly and make one thousand pounds of our composition.

Using the sponge-dough method and three percent of an addition agent, we ran a series of tests. In column I, below, a dough was made by the sponge-dough method using Southwest Patent flour and 3% of the weight of the flour of nonfat dry milk solids and the results shown obtained. In column II we see the results obtained from the identical dough with the use of 3% of cheese whey instead of the nonfat dry milk solids. In column III we see the results of adding 3% by weight of flour of our composition.

| | Perfect Score | I | II | III |
|---|---|---|---|---|
| Volume | 10 | 7 | 6 | 9 |
| Crust Color | 8 | 7 | 6 | 7 |
| Symmetry | 3 | 2 | 2 | 3 |
| Evenness of Bake | 3 | 3 | 3 | 3 |
| Crust Character | 3 | 3 | 2 | 3 |
| Break, Shred | 3 | 2 | 1 | 3 |
| Grain | 10 | 7 | 5 | 9 |
| Crumb Color | 10 | 7 | 6 | 8 |
| Aroma | 10 | 7 | 8 | 8 |
| Taste | 15 | 13 | 12 | 13 |
| Texture | 15 | 11 | 7 | 13 |
| Chewability | 10 | 8 | 8 | 8 |
| Total | 100 | 77 | 66 | 87 |

It will be observed that a bread baked with our composition had ten points better score than that baked with dry milk solids and twenty-one points better score than that obtained from cheese whey alone.

The above results are typical of those obtained from many tests.

It will be seen that we have accomplished the objects of our invention. We have provided a composition for making bread in which whey may be used instead of milk solids to produce a superior loaf of bread having increased volume, excellent grain, excellent crumb color, excellent aroma, taste and texture. We have provided a composition for the making of bread employing cheese whey having perfect break or shred characteristics. We have provided a composition enabling us to use whey as an addition agent for bread and rolls whereby we may increase nutritious minerals, lactalbumin and lactose in bread and give the bread superior baking qualities.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A composition for making bread including in combination a major proportion of dried cheese whey, a proportion of calcium carbonate between 11.47 and 19.12 per cent by weight and a proportion of calcium peroxide between 0.105 and 0.175 per cent by weight.

2. A composition for making bread including in combination a major proportion of dried cheese whey, a proportion of calcium carbonate between 11.47 and 19.12 per cent by weight, a lesser proportion of monocalcium acid phosphate and a proportion of calcium peroxide between 0.105 and 0.175 per cent by weight.

3. A composition for making bread including in combination a major proportion of dried cheese whey, a proportion of calcium carbonate between 11.47 and 19.12 per cent by weight and a proportion of calcium peroxide between 0.105 and 0.175 per cent by weight, said calcium peroxide being enrobed with a material selected from the class consisting of hydrogenated shortening and lard.

4. A composition for making bread including in combination a major proportion of dried cheese whey, a proportion of calcium carbonate between 11.47 and 19.12 per cent by weight, a lesser proportion of monocalcium acid phosphate and a proportion of calcium peroxide between 0.105 and 0.175 per cent by weight, said calcium peroxide being enrobed with a material selected from the class consisting of hydrogenated shortening and lard.

5. A composition for making bread including in combination approximately 85% by weight of dried cheese whey, 15% by weight of calcium carbonate and less than ½% by weight of calcium peroxide.

6. A composition for making bread including in combination approximately 85% by weight of dried cheese whey, 15% by weight of calcium carbonate, less than ½% by weight of calcium peroxide and less than 1% by weight of monocalcium acid phosphate.

7. A composition for making bread including in combination approximately 85% by weight of dried cheese whey, 15% by weight of calcium carbonate and less than ½% by weight of calcium peroxide, said calcium peroxide being enrobed with a material selected from the class consisting of hydrogenated shortening and lard.

8. A composition for making bread including in combination approximately 85% by weight of dried cheese whey, 15% by weight of calcium carbonate, less than ½% by weight of calcium peroxide and less than 1% by weight of monocalcium acid phosphate, said calcium peroxide being enrobed with a material selected from the class consisting of hydrogenated shortening and lard.

References Cited in the file of this patent

UNITED STATES PATENTS

| | | |
|---|---|---|
| 828,251 | Solliday | Aug. 7, 1906 |
| 1,286,904 | Atkinson | Dec. 10, 1918 |
| 1,370,354 | Patterson | Mar. 1, 1921 |
| 1,775,037 | Fiske | Sept. 2, 1930 |
| 2,035,899 | Kraft | Mar. 31, 1936 |

FOREIGN PATENTS

| | | |
|---|---|---|
| 6,103 | Great Britain | of 1891 |
| 158,684 | Great Britain | 1921 |

OTHER REFERENCES

Webb et al.: Jour. of Dairy Sciences, vol. 31, No. 2, Feb. 1948, pages 156, 157.

Federal Register, vol. 15, No. 152, Aug. 8, 1950, pages 5103, 5105.